(12) United States Patent
Shrestha et al.

(10) Patent No.: US 11,570,072 B1
(45) Date of Patent: Jan. 31, 2023

(54) COMMUNICATING WITH A DATA CENTER MANAGEMENT AND MONITORING CONSOLE VIA A BROKER

(71) Applicant: Dell Products L.P., Round Rock, TX (US)

(72) Inventors: Saurav Shrestha, Round Rock, TX (US); Jeffrey M. Lairsey, Round Rock, TX (US); Carlin Mendonca, Austin, TX (US); Margaret Patton, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/383,986

(22) Filed: Jul. 23, 2021

(51) Int. Cl.
*G06F 15/173* (2006.01)
*H04L 43/08* (2022.01)
*H04L 67/562* (2022.01)

(52) U.S. Cl.
CPC ............ *H04L 43/08* (2013.01); *H04L 67/562* (2022.05)

(58) Field of Classification Search
None
See application file for complete search history.

(56) References Cited

U.S. PATENT DOCUMENTS

| | | | |
|---|---|---|---|
| 10,498,845 B1* | 12/2019 | Kapoor | H04L 43/045 |
| 11,106,442 B1* | 8/2021 | Hsiao | G06F 11/3006 |
| 2005/0187940 A1* | 8/2005 | Lora | G06F 16/25 |
| 2015/0220942 A1* | 8/2015 | Dubberley | G06Q 30/0201 705/7.29 |
| 2017/0024408 A1* | 1/2017 | Foley | G06F 21/62 |
| 2017/0228460 A1* | 8/2017 | Amel | G06F 16/2462 |
| 2019/0340564 A1* | 11/2019 | Holmquist | H04L 43/062 |
| 2021/0152455 A1* | 5/2021 | Castle | H04L 43/10 |
| 2021/0258396 A1* | 8/2021 | Hulick, Jr. | H04L 67/42 |
| 2021/0365564 A1* | 11/2021 | Ewaida | G06F 21/577 |

* cited by examiner

*Primary Examiner* — Phuoc H Nguyen
(74) *Attorney, Agent, or Firm* — Terrile, Cannatti & Chambers; Stephen A. Terrile

(57) ABSTRACT

A system, method, and computer-readable medium are disclosed for performing a data center monitoring and management operation. The data center monitoring and management operation includes: identifying data center asset data to monitor; monitoring data center assets within a data center; selecting an asset data broker, the asset data broker performing an asset data aggregation operation, the asset data aggregation operation collecting and aggregating the data center asset data; and, providing aggregated data center asset data to a data center monitoring and management console.

20 Claims, 7 Drawing Sheets

US 11,570,072 B1

COMMUNICATING WITH A DATA CENTER MANAGEMENT AND MONITORING CONSOLE VIA A BROKER

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: identifying data center asset data to monitor; monitoring data center assets within a data center; selecting an asset data broker, the asset data broker performing an asset data aggregation operation, the asset data aggregation operation collecting and aggregating the data center asset data; and, providing aggregated data center asset data to a data center monitoring and management console.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying data center asset data to monitor; monitoring data center assets within a data center; selecting an asset data broker, the asset data broker performing an asset data aggregation operation, the asset data aggregation operation collecting and aggregating the data center asset data; and, providing aggregated data center asset data to a data center monitoring and management console.

In another embodiment the invention relates to a computer-readable storage medium embodying computer program code, the computer program code comprising computer executable instructions configured for: identifying data center asset data to monitor; monitoring data center assets within a data center; selecting an asset data broker, the asset data broker performing an asset data aggregation operation, the asset data aggregation operation collecting and aggregating the data center asset data; and, providing aggregated data center asset data to a data center monitoring and management console.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
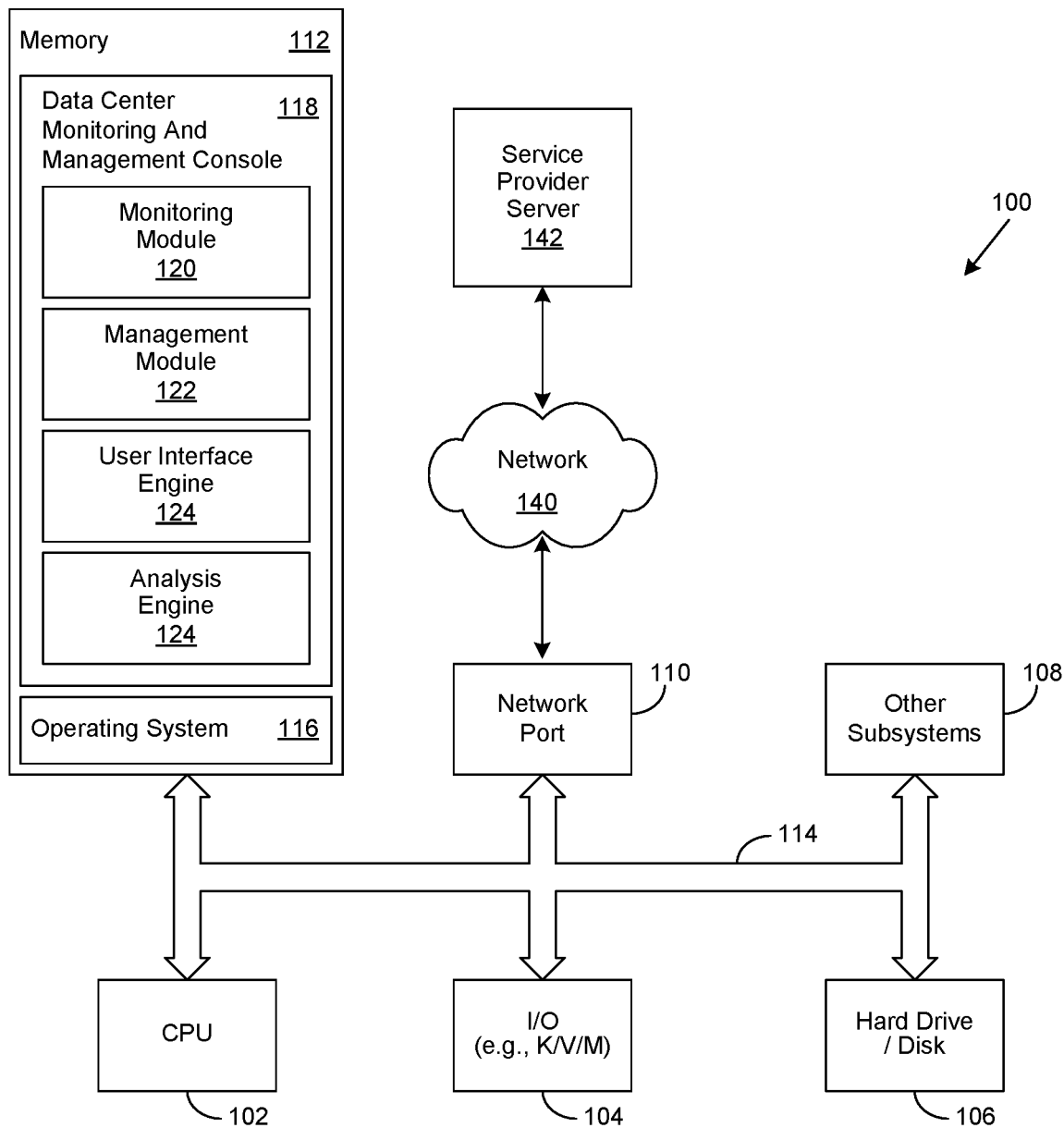
FIG. 1 shows a general illustration of components of an information handling system as implemented in the system and method of the present invention.

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads.

Certain aspects of the invention reflect an appreciation that on-premises data center management consoles are typically implemented to receive large amounts of operational and status data from assets within the data center. Certain aspects of the invention likewise reflect an appreciation that these assets are often implemented to push certain operational data, such as telemetry metrics, at preset intervals. It is also common for a data center management console to periodically ping certain data center assets for health status data. Certain aspects of the invention further reflect an appreciation that data center management console users currently lack control over how data center assets communicate with a data center management console, or the specific data that is collected and communicated, or how frequently such collection and communication takes place.

Various aspects of the invention reflect an appreciation that the collection and provision of certain data center asset data to a cloud-based data analysis service may occur at preset times and intervals. As an example, health data associated with various data center assets may be provided at five minute intervals. However, these intervals may be too often for some data center assets and too infrequent for others. Furthermore, the use of such polling intervals may result in inefficient use of network bandwidth and computing resources.

Various aspects of the invention likewise reflect an appreciation that certain data center assets and associated workloads, such as high availability clusters or mission critical applications, may require more frequent and prioritized monitoring. Certain aspects of the invention reflect an appreciation that some data center management console solutions may allow user customization of polling intervals for specific types of devices or information types, setting each of these per device becomes a cumbersome task on a large scale. Likewise, certain aspects of the invention reflect an appreciation that the ability to intelligently automate the provision of data center asset operational and status data would likely lead to more efficient use of data center resources while simultaneously providing more effective management data center assets.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, and a user interface engine 124, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
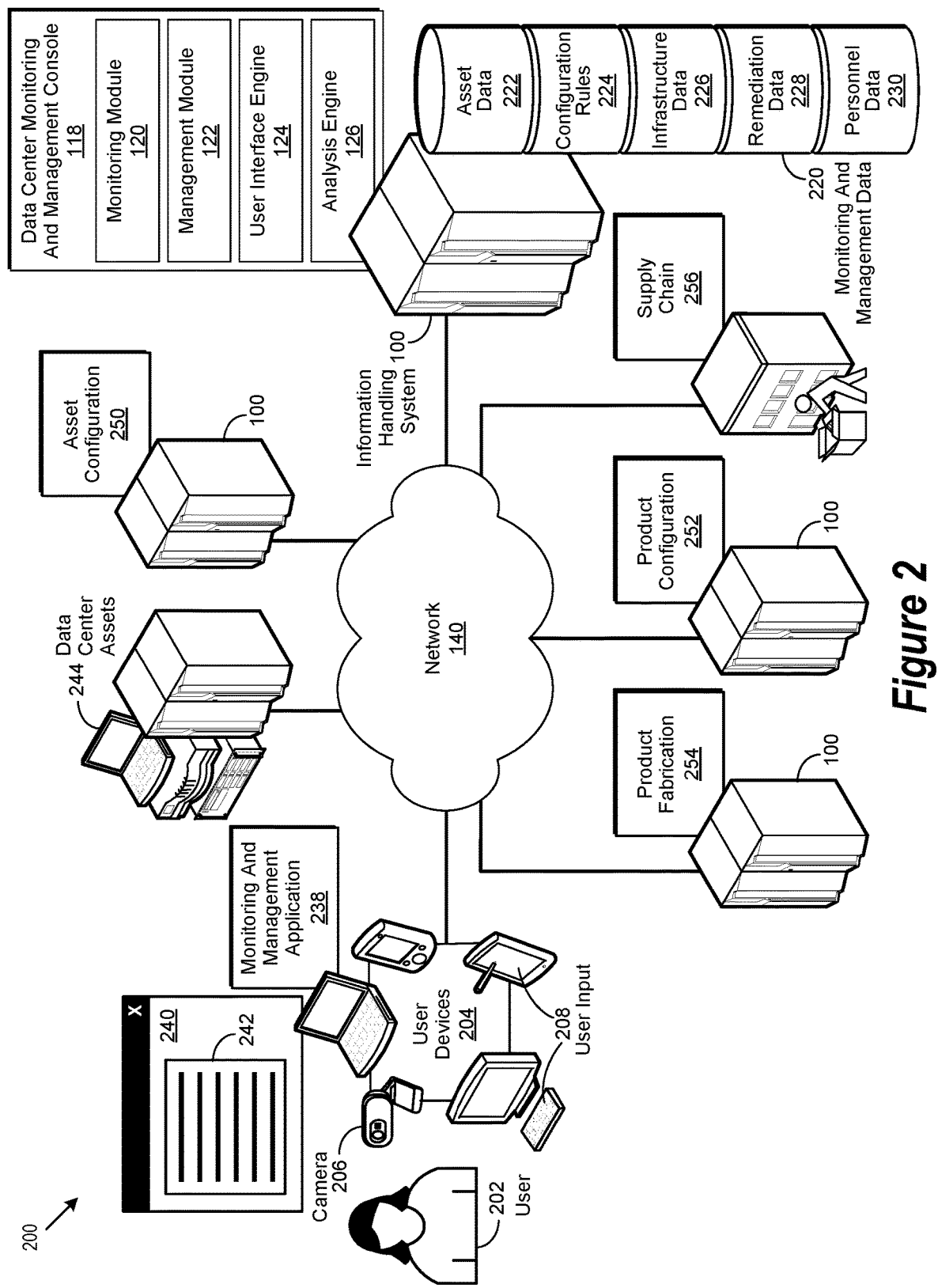
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, and a user interface (UI) engine 124, or a combination thereof In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may be implemented to generate a UI for the provision, or receipt, of certain information associated with the monitoring, or management, of a particular data center asset 244. In various embodiments, some combination of the monitoring module 120, the management module 122 and the UI engine 124 may be implemented to perform an asset data broker operation, described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, and data center personnel data 230.

As used herein, data center asset data 222 broadly refers to information associated with a particular data center asset 244, such as an information handling system 100, or an associated workload, that can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 222 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In certain embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
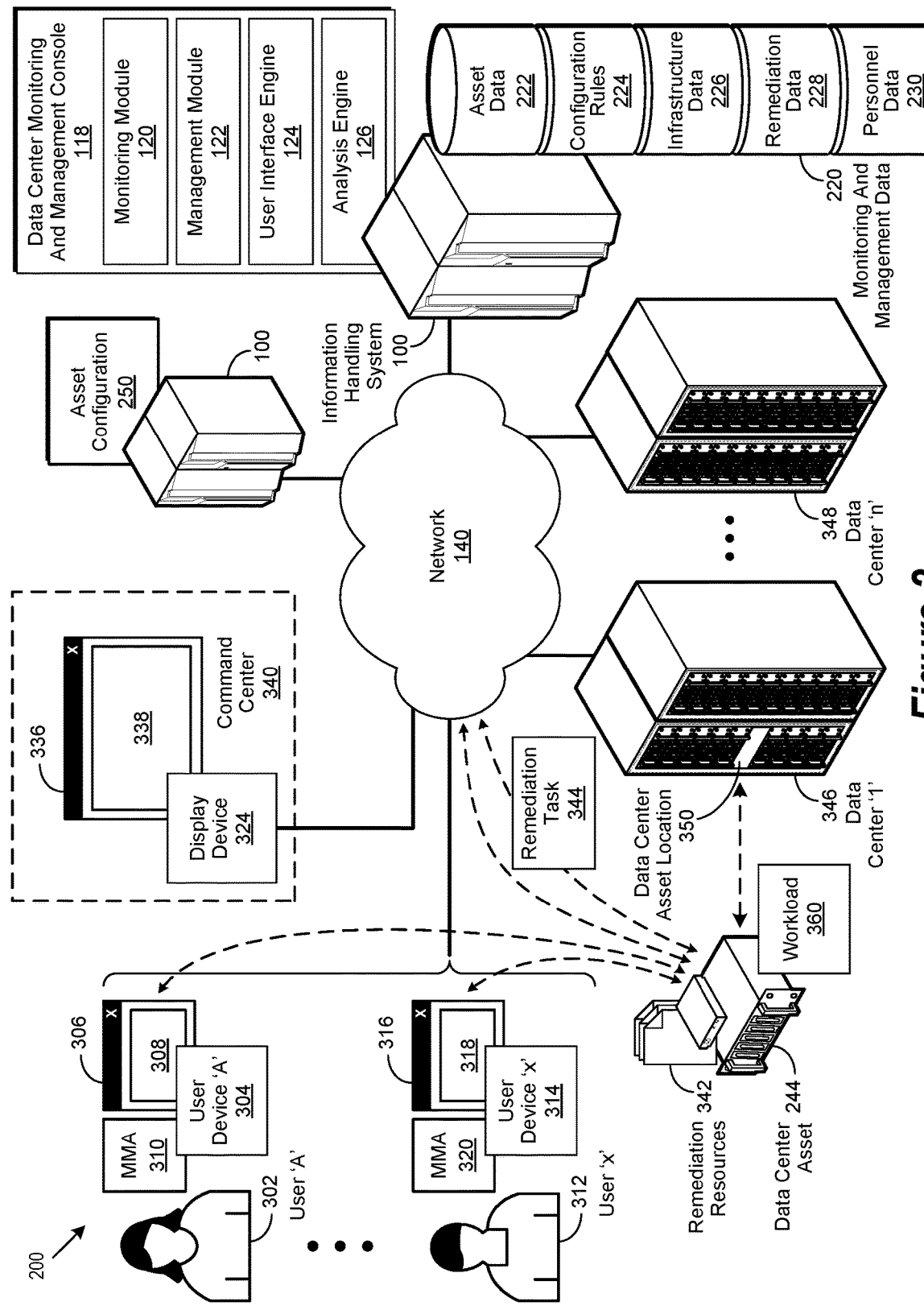
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein.

In certain embodiments, a data center asset 244 may be implemented to process an associated workload 360. A workload 360, as used herein, broadly refers to a measure of information processing that can be performed by one or more data center assets 244, individually or in combination with one another, within a data center monitoring and management environment 200. In certain embodiments, a workload 360 may be implemented to be processed in a virtual machine (VM) environment, familiar to skilled practitioners of the art. In various embodiments, a workload 360 may be implemented to be processed as a containerized workload 360, likewise familiar to those of skill in the art.

In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, and a user interface (UI) engine 124, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application 310 through 320, described in greater detail herein, may be respectively implemented on user devices 'A' 304 through 'x' 314. In certain embodiments the UI window 306 through 316 may be respectively implemented as a UI window of the data center monitoring and management application 310 through 320. In certain embodiments, the data center monitoring and management application 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 340, familiar to those of skill in the art, such as a command center 340 typically found in a data center or a network operations center (NOC). In various embodiments, one or more of the users 'A' 302 through 'x' 312 may be located within the command center 340. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof For example, a data center system administrator may be responsible for the creation of data center asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244, or an associated workload 360, in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 340 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4:
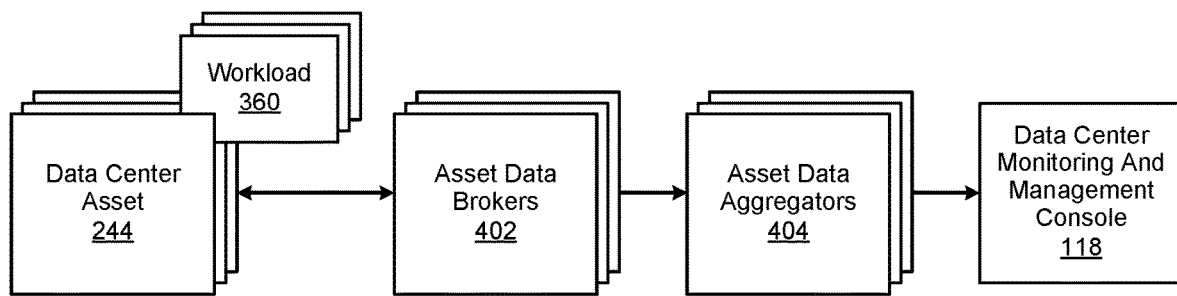
FIG. 4 shows a simplified block diagram of an asset data broker implemented to provide certain data center asset data to an associated asset data aggregator.

FIG. 4 shows a simplified block diagram of an asset data broker implemented in accordance with an embodiment of the invention to provide certain data center asset data to an associated asset data aggregator. In various embodiments, one or more asset data brokers 402 may be implemented to collect certain data center asset data from a particular data center asset 244, or an associated workload 360, and provide it to an associated asset data aggregator 404. As used herein, an asset data broker 402 broadly refers to an intermediary computer program module implemented to collect a pre-specified element, type, or class, of data center asset data, described in greater detail herein, from a particular data asset 244, or an associated workload 360, on a scheduled basis. As likewise used herein, an asset data aggregator 404 broadly refers to an intermediary computer program module implemented to aggregate data center asset data provided by one or more associated asset data brokers 402. In these embodiments, the method used to determine which data center asset data is to be collected by a particular asset data broker 402, how it is collected and the schedule by which it is collected, how it is provided to an associated asset data aggregator 404 for aggregation, and how it is aggregated, is a matter of design choice.

In various embodiments, an asset data aggregator 404 may be implemented to provide certain data center asset data aggregated from one or more asset data brokers 402 to a data center monitoring and management console 118, described in greater detail herein, or other systems, or a combination thereof, on a scheduled basis. In these embodiments, the method used to determine which aggregated data center asset data is provided to a data center monitoring and management console 118, or other systems, how it may be provided, and the schedule by which it is provided, is a matter of design choice. In various embodiments, an asset data aggregator 404 may be implemented to stream certain aggregated data center asset data to a data center monitoring and management console 118, or other systems, as it is received from an asset data broker 402. In various embodiments, an asset data aggregator 404 may be implemented to persist certain aggregated data center asset data after it has been provided to a data center monitoring and management console 118, or other systems.

In various embodiments, an asset data aggregator 404 may be implemented to normalize certain data center asset data aggregated from one or more asset data brokers 402 into a predefined, standardized form before it is provided to a data center monitoring and management console 118. In these embodiments, the method used to select a particular data format to normalize the aggregated data center asset data, and the method by which such normalization is performed, is a matter of design choice. Skilled practitioners of the art will recognize that many such embodiments are possible. Accordingly, the foregoing is not intended to limit the spirit, scope, or intent of the invention.

Figure 5:
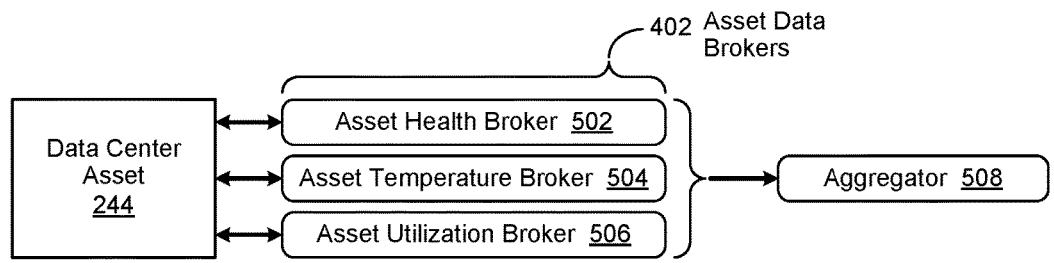
FIG. 5 shows a simplified block diagram of a plurality of asset data brokers implemented to collect certain data center asset data corresponding to a particular data center asset.

FIG. 5 shows a simplified block diagram of a plurality of asset data brokers implemented in accordance with an embodiment of the invention to collect certain data center asset data corresponding to a particular data center asset. In certain embodiments, one or more asset data brokers 402 may respectively be implemented to individually collect a pre-specified element, type, or class, of data center asset data from a particular data center asset 244 and provide it to an associated asset data aggregator 508. As an example, the data center asset 244 shown in FIG. 5 may be a particular server implemented at a particular data center. In this example, three different asset data brokers 402 have been respectively implemented to collect a particular type of data center asset data from the data center asset 244.

To continue the example, one asset data broker 402 may be implemented to collect certain data center asset operating health data 502, familiar to those of skill in the art, from the server. Likewise, another asset data broker 402 may be implemented to collect certain data center asset operating temperature 504 data from the server, while yet another asset data broker 402 may be implemented to collect certain data center asset utilization 506 data from the server. To continue the example yet further, the data center asset data respectively collected by the three asset data brokers 402 is then provided to an associated asset data aggregator 508 for aggregation.

In various embodiments, the same group of asset data brokers 402 may be respectively implemented to collect the same types of data center asset data from two or more data center assets 244. In certain embodiments, the same group of asset data brokers 402 may likewise be respectively implemented to provide the data center asset data they may individually collect to the same asset data aggregator 508. As an example, a data center may have an installed base of one hundred servers, all of which are manufactured by the same manufacturer and have the same configuration. In this example, the same group of asset data brokers 402 is respectively implemented to collect the same data center asset data from each of the one hundred servers. To continue the example, the data center asset data respectively collected by each of the asset data brokers 402 is then provided to the same asset data aggregator 508, where it is aggregated.

Figure 6:
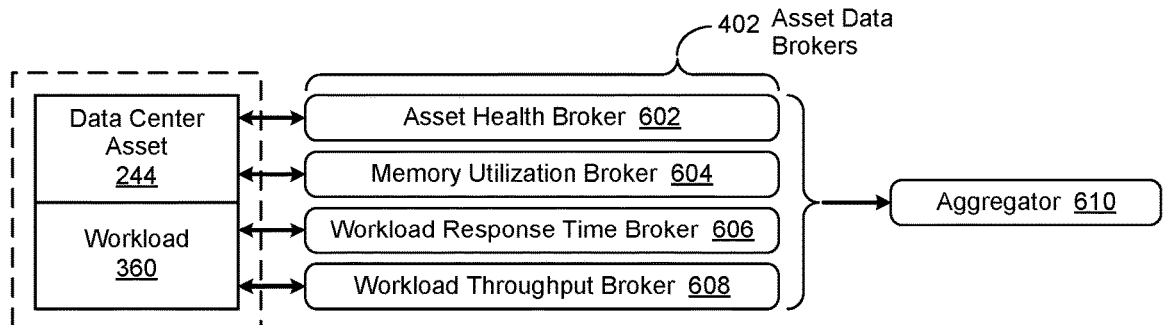
FIG. 6 shows a simplified block diagram of a plurality of asset data brokers implemented to collect certain data center asset data corresponding to a particular data center asset and an associated workload.

FIG. 6 shows a simplified block diagram of a plurality of asset data brokers implemented in accordance with an embodiment of the invention to collect certain data center asset data corresponding to a particular data center asset and an associated workload. In certain embodiments, one or more asset data brokers 402 may respectively be implemented to individually collect a pre-specified element, type, or class, of data center asset data from a particular data center asset 244, or an associated workload 360, and provide it to an associated asset data aggregator 610. As an example, the data center asset 244 shown in FIG. 6 may be a particular server implemented at a particular data center to run an associated in-memory database workload 360 familiar to skilled practitioners of the art.

In this example, two different asset data brokers 402 have been respectively implemented to collect a particular type of data center asset data from the data center asset 244 and two others have been respectively implemented to collect a particular type of data center asset data from its associated workload 360. To continue the example, one asset data broker 402 may be implemented to collect certain data center asset operating health 602 data, familiar to those of skill in the art, from the server, while another asset data broker 402 may be implemented to collect certain data center asset memory utilization 604 data from the server. Likewise, one asset data broker 402 may be implemented to collect certain data center asset workload response time 606 data from the in-memory database workload 360, while another asset data broker 402 may be implemented to collect certain data center asset workload throughput 608 data from the workload 360. To continue the example yet further, the data center asset data respectively collected by each of the four asset data brokers 402 is then provided to an associated asset data aggregator 608 for aggregation.

In certain embodiments, data center asset data respectively collected by asset data brokers 402 from a particular data center asset 244 and an associated workload 360 may be used to draw correlations between the operational status of the data center asset 244 and the operational status of an associated workload 360. To continue the prior example, the server may have 64 gigabytes (GB) of its memory originally allocated to operations performed by the in-memory database. However, over time, the volume of operations performed by the in-memory database has doubled, while throughput has decreased proportionately. In this example, the ability to correlate the increased volume of operations to a proportional decrease in throughput may provide an indication that current throughput of the in-memory database could be improved to its former level if the amount of memory is increased (e.g., to 128 GB).

Figure 7:
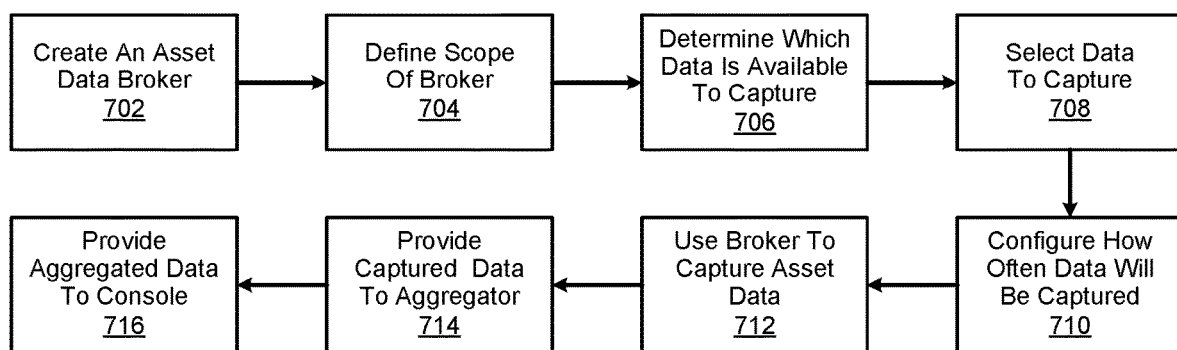
FIG. 7 is a simplified process flow diagram showing the performance of asset data aggregation operations.

FIG. 7 is a simplified process flow diagram showing the performance of asset data aggregation operations implemented in accordance with an embodiment of the invention. In certain embodiments, a data center monitoring and management console, described in greater detail herein, may be implemented to perform an asset data aggregation operation. As used herein, an asset data aggregation operation broadly refers to any function, operation, procedure, or process performed, directly or indirectly by an asset data broker and an associated asset data aggregator, individually or in combination, to collect and aggregate certain data center asset data from a particular data asset, or an associated workload, or both, and provide it to a data center monitoring and management console, or other system, on a scheduled basis, as described in greater detail herein.

In certain embodiments, asset data aggregation operations may be initiated by creating an asset data broker in step 702, as described in greater detail herein. The scope of the newly-created asset data broker is then defined in step 704. As used herein, as it relates to an asset data broker, scope broadly refers to a range of uses for data center asset data collected from a particular data center asset or an associated workload. For example, a variety of operational data center asset data associated with a server may be available for collection by an asset data broker, such as its configuration, operational temperature, memory utilization, and so forth. In this example, the scope of the asset data broker created in step 702 may be defined to be the collection of certain operational temperature data from a particular server.

Once the scope of the asset data broker has been defined, then a determination is made in step 706 which data center asset data elements, types, or classes are available for collection from a particular data center asset, or an associated workload. Thereafter, the data center asset data to be collected is selected from the available data center asset data elements, types, or classes in step 708. As an example, a data center asset data class of "operational temperature" may be selected. In this example, the "operational temperature" class of data center asset data may include individual data elements respectively related to the operational temperature of each central processing unit (CPU) in a server.

Then, in step 710, the frequency of the collection of the selected data center asset data elements, types, or classes is configured. To continue the prior example, the asset data broker may be configured to collect the operational temperature of each CPU in a particular server every fifteen seconds. Once the data center asset data collection frequency has been configured for the asset data broker, it is then used in step 712 to collect the selected data center asset data, at its configured frequency, from a particular data center asset, or associated workload. The data center asset data collected by the asset data broker is then provided to an associated asset data aggregator in step 714 for aggregation. In turn, as described in greater detail herein, the asset data aggregator then provides the aggregated data center asset data to a data center monitoring and management console, or other system, on a scheduled basis in step 716.

Figure 8:
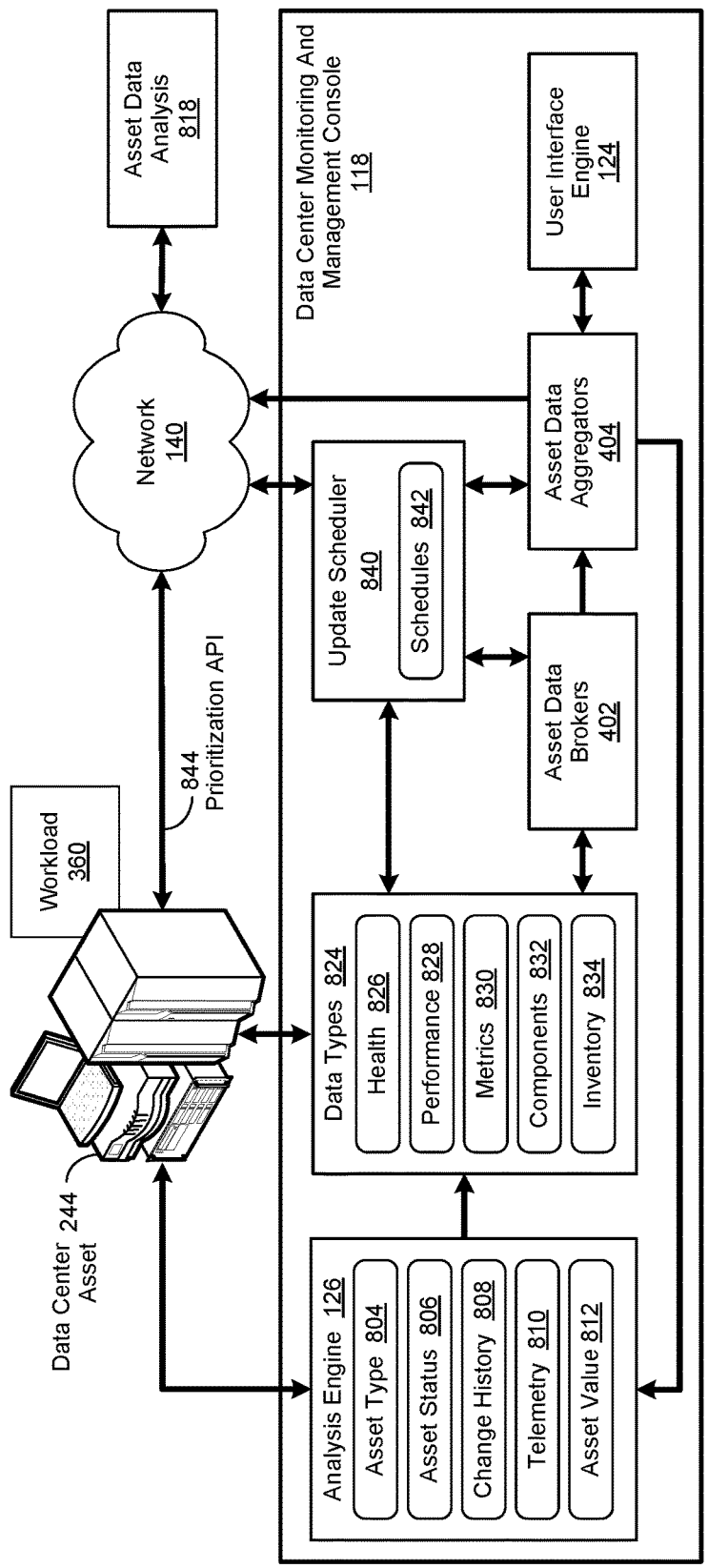
FIG. 8 is a functional block diagram showing the performance of adaptive update scheduling operations.

FIG. 8 is a functional block diagram showing the performance of adaptive update scheduling operations implemented in accordance with an embodiment of the invention. In certain embodiments, a data center monitoring and management console 118, described in greater detail herein, may be implemented to include an analysis engine 126, one or more asset data brokers 402, one or more asset data aggregators 404, an adaptive update scheduler module 840, and a user interface engine 124, or a combination thereof. In certain embodiments, the data center monitoring and management console 118 may be implemented to use the analysis engine 126, one or more asset data brokers 402, one or more asset data aggregators 404, and the adaptive update scheduler module 840, or a combination thereof, to perform an adaptive update scheduling operation. As used herein, an adaptive update scheduling operation broadly refers to any function, operation, procedure, or process performed, directly or indirectly, to adaptively adjust the prioritization and frequency of data center asset data collection, aggregation, and provision, or a combination thereof, according to certain predefined criteria.

In certain embodiments, the criteria may be manually defined by a user. As an example, one server in a data center may be implemented to run an online banking workload for a major financial institution, while another server in the same data center may be implemented to run a content hosting workload for a small business. In this example, maintaining high availability, low response times, and high throughput for the online banking workload may be considered to be more critical than achieving the same objectives for the content hosting workload.

Accordingly, the availability, response time, and throughput of the online banking workload may be prioritized over the content hosting workload. To continue the example, due to its higher priority, criteria may be defined by the user such that operational health data is collected from the server running the online banking workload once every minute, as long as its availability, response time, and throughput remain within certain predefined parameters. Likewise, due to its lower priority, criteria may be defined by the user such that operational health data is collected from the server running the content hosting workload once every five minutes, as long as its availability, response time, and throughput remain within certain predefined parameters.

To continue the example further, additional criteria may be defined by the user such that operational health data is collected from the server running the online banking workload once every fifteen seconds if either its availability, response time, or throughput, or a combination thereof, exceed certain predefined parameters for more than thirty seconds. Likewise, additional criteria may be defined by the user such that operational health data is collected from the server running the content hosting workload once every minute if either its availability, response time, or throughput, or a combination thereof, exceed certain predefined parameters for more than thirty seconds. To continue the example yet further, additional criteria may be defined by the user such that if operational health data is collected from the server running the online banking workload every fifteen seconds due to exceeding certain predefined parameters for more than thirty seconds, then operational data would be collected from the server running the content hosting workload once every ten minutes, so long as its operational health remain within its predefined parameters.

In various embodiments, the analysis engine 126 may be implemented to automatically define the criteria as a result of analyzing certain information associated with a particular data center asset 244, or an associated workload 360, as described in greater detail herein. In various embodiments, the analysis engine 126 may be implemented to receive certain user input, which in certain embodiments can be used by the analysis engine 126 to semi-automatically define the criteria. In certain of these embodiments, the analysis engine 126 may be implemented to semi-automatically define the criteria by making criteria definition suggestions to a user while guiding them through the criteria definition process. In various embodiments, the analysis engine 126 may be implemented to use certain rules-based, pattern matching, machine learning, or artificial intelligence (AI) approaches known to skilled practitioners of the art to automatically, or semi-automatically, define the criteria. In these embodiments, the rules-based, pattern matching, machine learning, or AI approaches, or a combination thereof, used to automatically or semi-automatically define the criteria is a matter of design choice.

In various embodiments, the analysis engine 126 may be implemented to analyze certain information associated with a particular data center asset 244, or an associated workload 360, to determine what kinds of information it may be able to provide. In certain embodiments, the information associated with a data center asset 244 may include its data center asset type 804. Examples of data center asset types include servers, storage arrays, routers, network switches, desktop computers, laptop computers, and so forth.

In certain embodiments, the information associated with a data center asset 244 may include its data center asset status 806. Examples of a data center asset's status 806 include, operational, degraded, dormant, non-operational, and so forth. In certain embodiments, a data center asset's status 806 may be provided in the form of a data center alert, described in greater detail herein. In certain embodiments, the information associated with a data center asset 244 may include its data center asset change history 808. Examples of a data center asset's change history include when its configuration has changed, and in what way, when it has entered a non-optimal operational state, and how often, when it has been underutilized, or overutilized, or both, and how often, and so forth.

In certain embodiments, the information associated with a data center asset 244 may include its data center asset telemetry 810 capabilities. Examples of a data center asset's telemetry 810 capabilities include being able to provide telemetry related to its operational temperature, the utilization of certain of its components, its availability, its throughput, and so forth. In certain embodiments, the information associated with a data center asset 244 may include its data center asset value 812. Examples of a data center asset's value 812 include the amount of monthly revenue associated with the use of the data center asset, its criticality in the production of such revenue, other data center assets that rely upon its operational availability, and so forth.

In various embodiments, the analysis engine 126 may be implemented to use certain rules-based, pattern matching, machine learning, or AI approaches known to those of skill in the art to determine what kinds of information can be provided by a particular data center asset 244, or an associated workload 360. In these embodiments, the rules-based, pattern matching, machine learning, or AI approaches, or a combination thereof, used to determine what kinds of information can be provided by a particular data center asset, or an associated workload 360, is a matter of design choice. Skilled practitioners of the art will recognize that many such embodiments, and examples of information associated with a data center asset 244, or an associated workload 360, are possible. Accordingly, the foregoing is not intended to limit the spirit, scope, or intent of the invention.

In various embodiments, the analysis engine 126 may be implemented to analyze the asset type 804, asset status 806, change history 808, telemetry 810, asset value 812, and other information associated with a particular data center asset 244, or an associated workload 360, to determine what elements, types, or classes 824 of data center asset data are available for collection. In various embodiments, the elements, types, or classes 824 of data center asset data available for collection may include data corresponding to a particular data center asset's 244, or an associated workload's 360, health 826, performance 828, operational metrics 830, components 832, and inventory 834, or a combination thereof. In certain embodiments, the inventory 834 data center asset data may include an inventory of data center asset resources that are currently allocated, or available for allocation, to a particular workload 360. As used herein, a data center asset resource broadly refers to a discrete aspect, element, or component of a data center asset 244 that can be utilized, directly or indirectly, in whole or in part, to process a particular workload 360. Examples of data center asset resources include a central processing unit (CPU), or an individual core or cycles thereof, memory, such as random access memory (RAM), or a portion thereof, storage, such as a disk drive, or a portion thereof, an input/output (I/O) port, such as an I/O port of a server, router, or network switch, and so forth.

In various embodiments, as described in greater detail herein, one or more asset data brokers 402 may be implemented to collect certain elements, types, or classes 824 of data center asset data on a scheduled basis. In various embodiments, as likewise described in greater detail herein, an asset data aggregator 404 may be implemented to receive certain data center asset data collected by one or more asset data brokers 402 on a scheduled basis. In various embodiments, an asset data aggregator 404 may be implemented, as likewise described in greater detail herein, to provide certain aggregated data center asset data to a data center monitoring and management console 118 on a scheduled basis. In these embodiments, the timing and frequency of the scheduled basis is a matter of design choice.

In various embodiments, an asset data aggregator 404 may be implemented, as described in greater detail herein, to provide certain aggregated data center asset data to an analysis engine 126 on a scheduled basis. In certain of these embodiments, the analysis engine 126 may be implemented to use the aggregated data center asset data to facilitate the analysis of the asset type 804, asset status 806, change history 808, telemetry 810, asset value 812, and other information associated with a particular data center asset 244, or an associated workload 360. In various embodiments, a particular asset data aggregator 404 may be implemented to provide certain aggregated data center asset data to a user interface (UI) engine 124. In certain of these embodiments, the UI engine 124 may be implemented to use the aggregated data center asset data to populate one or more UI windows of the data center monitoring and management console 118.

In certain embodiments, an asset data aggregator 404 may be implemented to use a connection to a network 140 to provide certain aggregated data center asset data to a cloud-based asset data analysis 818 system or service. One example of a cloud-based asset data analysis 818 service is CloudIQ™ a Software as a Service (SaaS) provided by Dell Technologies™, headquartered in Round Rock, Texas, that allows uses to monitor, analyze, and troubleshoot their storage systems with an Internet browser. In certain embodiments, a cloud-based data center monitoring and management console may be implemented as a cloud-based asset data analysis 818 system or service. As used herein, a cloud-based data center monitoring and management console broadly refers to a data center monitoring and management console whose capabilities and functionality can be accessed, and provided, via a network 140 connection.

In various embodiments, an adaptive update scheduler 840 module may be implemented to perform an adaptive update scheduling operation. As used herein, an adaptive update scheduling operation broadly refers to any to any task, function, procedure, or process performed, directly or indirectly by the adaptive update scheduler 840 module to generate an adaptive update schedule 842. As likewise used herein, an adaptive update schedule broadly refers to a procedural plan capable of being implemented to adaptively adjust the time, sequence, and frequency of the collection, aggregation, or provision, or a combination thereof, of certain data center asset data associated with a particular data center asset, or associated workload 360. In various embodiments, the resulting adaptive update schedule 842 may be implemented to control which elements, types, or classes 824 of data center asset data associated with a particular data center asset 244, or an associated workload 360, are provided to a cloud-based asset data analysis 818 system or service via a network 140 connection. In certain of these embodiments, the adaptive update scheduler 840 may likewise be implemented to dynamically adjust the adaptive update schedule 842 according to certain criteria, described in greater detail herein.

In various embodiments, an adaptive update schedule 842 may be implemented to control which elements, types, or classes 824 of data center asset data associated with a particular data center asset 244, or an associated workload 360, are collected by a particular asset data broker 402, or aggregated by an associated asset data aggregator 404, or both. In various embodiments, an adaptive update schedule 842 may be implemented to control which aggregated data center asset data is provided by an asset data aggregator to a data center monitoring and management console 118, or a cloud-based asset data analysis 818 system or service, or a combination thereof. In certain of these embodiments, an adaptive update schedule 842 may be implemented to adjust the prioritization, timing, and frequency of such data center asset data collection, aggregation, and provision, or a combination thereof In certain embodiments, the adaptive update schedule 842 may be provided to the cloud-based asset data analysis 818 system or service in the form of a prioritization Application Program Interface (API) 844, described in greater detail herein. In various embodiments, the prioritization API 844 may be implemented to allow the cloud-based asset data analysis 818 system or service to directly receive certain data center asset data elements, types, or classes, or a combination thereof, directly from a data center asset 244 or an associated workload 360. In various embodiments, the prioritization API 844 may likewise be implemented to collect certain data center asset data elements, types, or classes at different times and at different frequency intervals. Likewise, in various embodiments, the prioritization API 844 may be implemented to give certain data center assets 244, or an associated workload 360, or their respective data center asset data elements, types, or classes priority over other data center assets 244, or their associated workloads 360, or their respectively associated elements, types, or classes of data center asset data.

Figure 9:
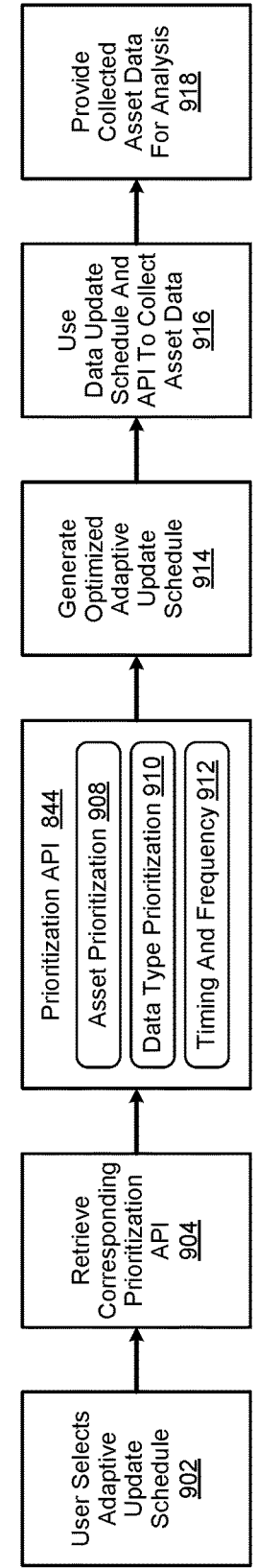
FIG. 9 is a functional block diagram showing the use of a prioritization Application Program Interface (API) to collect certain data center asset data for analysis.

FIG. 9 is a functional block diagram showing the use of a prioritization Application Program Interface (API) to collect certain data center asset data for analysis. In various embodiments, a prioritization API 844, as described in greater detail herein, may be implemented to collect certain data center asset data associated with a particular data center asset, or an associated workload, or both, for analysis by a cloud-based data analysis system or service, described in greater detail herein. In various embodiments, the prioritization API 844 may be implemented to include a data center asset prioritization 908 module, a data element, type, and class prioritization module 912, and a timing and frequency module 912, or a combination thereof.

In certain embodiments, the data center asset prioritization 908 module and the data element, type, and class prioritization module 912, or a combination of the two, may be implemented to give certain data center assets, or an associated workload, or their respective data center asset data elements, types, or classes priority over other data center assets, or their associated workloads, or their respectively associated elements, types, or classes of data center asset data. In various embodiments, the timing and frequency module 912 may be implemented to collect certain data center asset data elements, types, or classes at different times and at different frequency intervals.

In this embodiment, a user may initiate the use of a particular prioritization API 844 to collect certain data center asset data by first selecting a particular adaptive update schedule, described in greater detail herein, in step 902. Once the user selects an adaptive update schedule in step 902, a corresponding prioritization API 844 is retrieved in step 904. The adaptive update schedule is then optimized in step 914, if needed, and then used in combination with the prioritization API to collect certain data center asset data in step 916. The data center asset data collected in step 916 is then provided to a target system or service for analysis in step 918.

Figure 10:
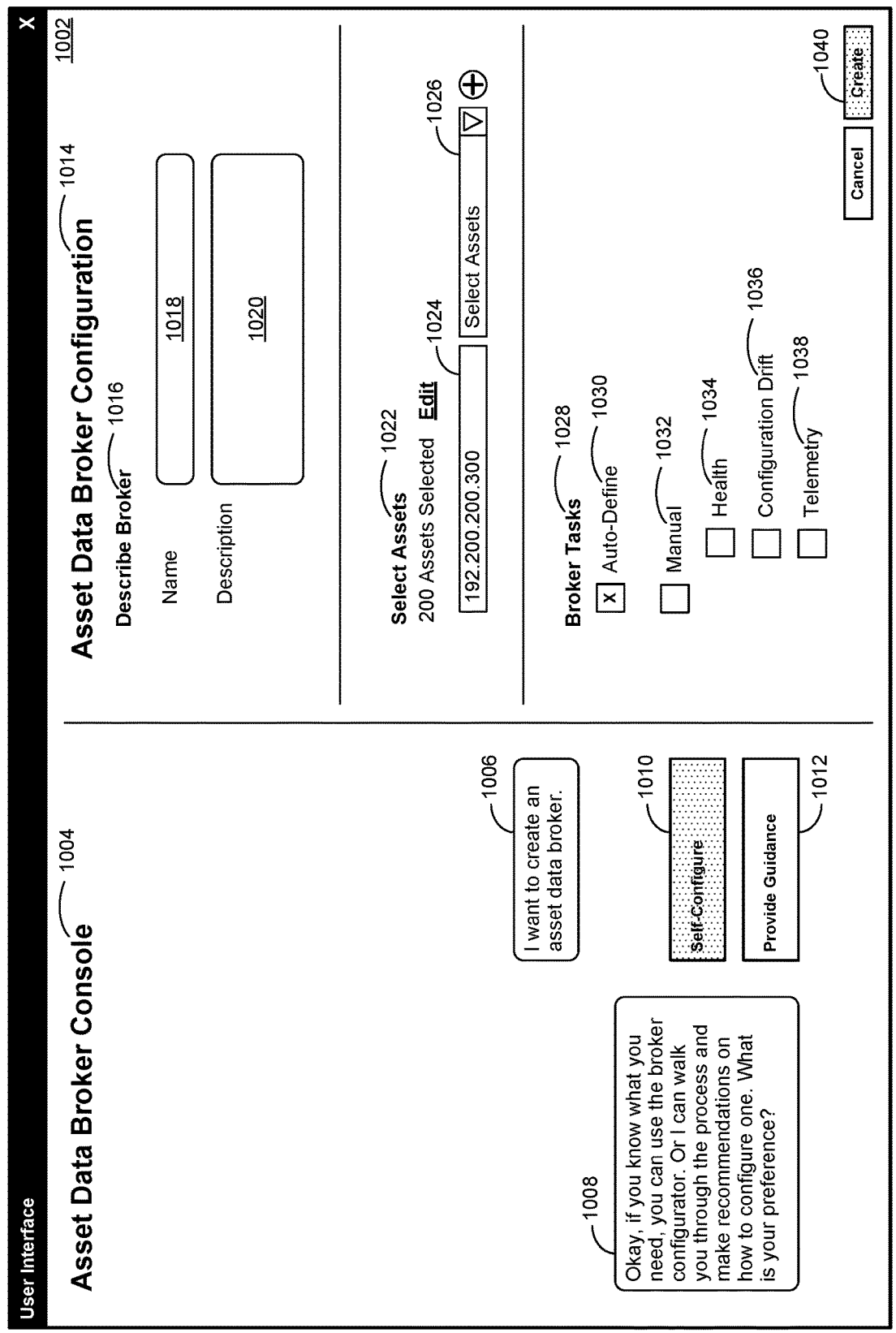
FIG. 10 shows an example screen presentation of a user interface (UI) implemented to generate an asset data broker.

FIG. 10 shows an example screen presentation of a user interface (UI) implemented in accordance with an embodiment of the invention to generate an asset data broker. In this embodiment, a data center monitoring and management console UI 1002 is implemented to display an asset data broker console 1004 window and an asset data broker configuration 1014 window. As shown in FIG. 10, a user may enter a request, such as "I want to create an asset data broker." into a user request field 1006. In response, the data center monitoring and management console UI 1002 may be implemented to respond with a response, such as "Okay, if you know what you need, you can use the configurator. Or I can walk you through the process and make recommendations on how to configure one. What is your preference?" within a console response field 1008.

In certain embodiments, the data center monitoring and management console UI 1002 may be implemented to respond with one or more command buttons, such as "Self-Configure" 1010 or "Provide Guidance" 1012. In this embodiment, the user selects the "Self-Configure" 1010 command button through the use of a user gesture, such as a mouse click. As a result, the asset data broker configuration 1014 window is displayed within the UI 1002 of the data center monitoring and management console. As likewise shown in FIG. 10, the asset data broker configuration 1014 window may be implemented to include a "Describe Broker" 1016 sub-window, a "Select Assets" 1022 sub-window, and a "Broker Tasks" 1028 sub-window.

In this embodiment, the "Describe Broker" 1016 sub-window is implemented with a "Name" 1018 data entry field and a "Description" 1020 data entry field. In certain embodiments, the user may respectively select an asset data broker name of their choice, and describe it accordingly in the "Name" 1018 and "Description" 1020 data entry fields. In certain embodiments, the "Select Assets" 1022 sub-window may be implemented with a data center asset Internet Protocol (IP) address" 1024 data display window and a data center asset selection 1026 drop-down window. In this embodiment, the data center asset selection 1026 is implemented to allow a user to select a particular data center asset, or an associated workload, for collection of certain data center asset data. Likewise, the "Broker Tasks" 1028 sub-window is implemented to contain an "Auto Define" 1030 selection box and a "Manual"1032 selection box. As shown in FIG. 10, the "Manual"1032 selection box is further implemented to include "Health" 1034, "Configuration Drift" 1036, and "Telemetry" 1038 selection boxes. As shown in FIG. 10, selecting the "Create" 1040 command button results in user input and selections within the "Describe Broker" 1016 sub-window, a "Select Assets" 1022 sub-window, and a "Broker Tasks" 1028 sub-windows being used to generate an asset data broker.

Figure 11:
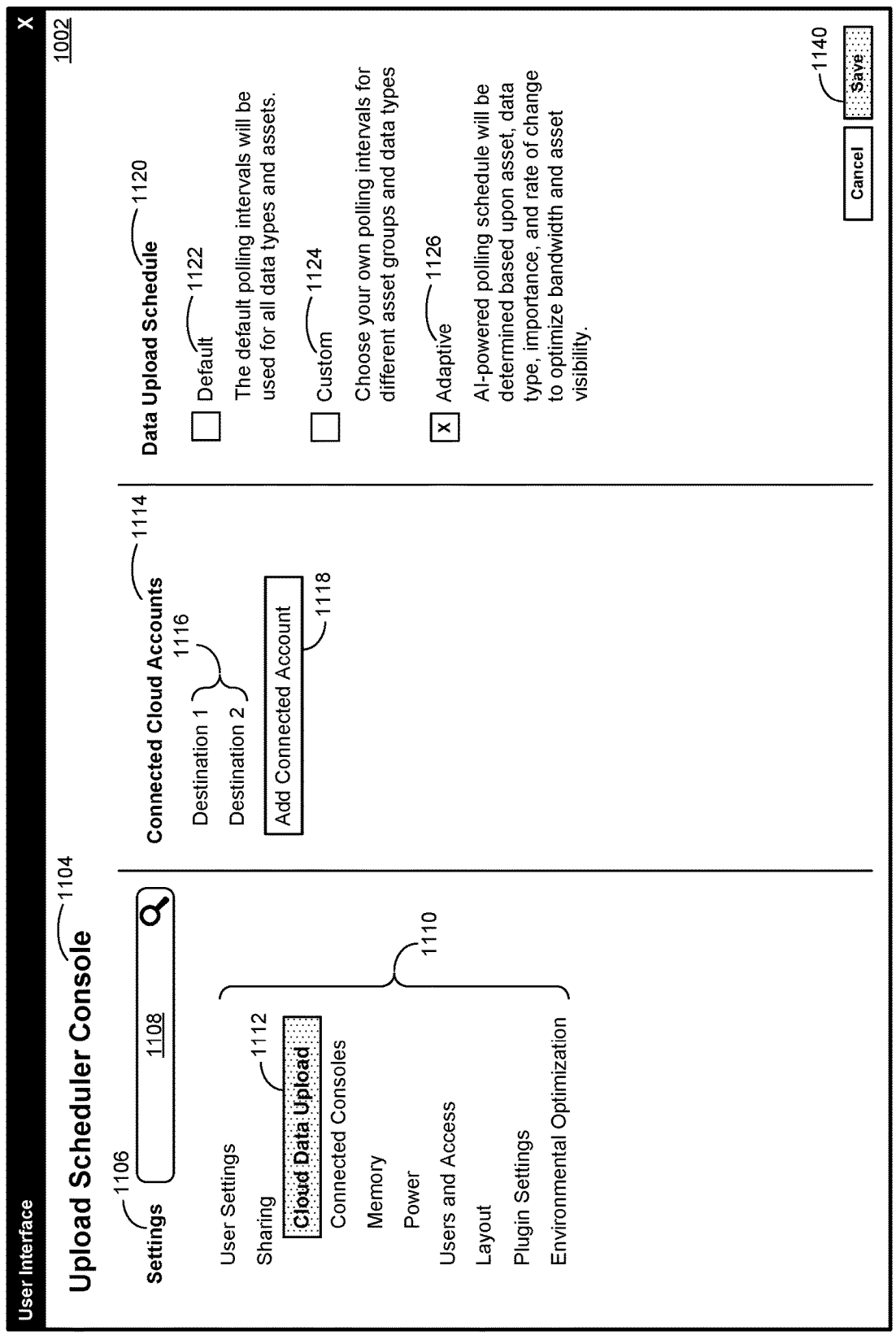
FIG. 11 shows an example screen presentation of a UI implemented to create an adaptive update schedule.

FIG. 11 shows an example screen presentation of a user interface (UI) implemented in accordance with an embodiment of the invention to create an adaptive update schedule. In this embodiment, a data center monitoring and management console UI 1002 is implemented to display an upload scheduler console 1104 window. Likewise, the upload scheduler console 1104 window may be implemented in certain embodiments to include a "Settings" 1116 sub-window, a "Connected Cloud Accounts" 1114 sub-window, and a "Data Upload Schedule" 1120 sub-window.

In certain embodiments, the "Settings" 1106 sub-window may be implemented with a search 1108 window and a settings directory tree 1110. As shown in FIG. 11, "Cloud Data Upload" 1112 entry in the settings directory tree 1110 has been selected. As a result, the "Connected Cloud Accounts" 1114 and "Data Upload Schedule" 1120 sub-windows are displayed within the upload scheduler console 1104 window.

In this embodiment, the "Connected Cloud Accounts" 1114 sub-window is implemented with a listing 1116 of destination choices and a "Add Connection Account" 1118 command button. In this embodiment, the "Data Upload Schedule" 1120 sub-window is likewise implemented to contain an "Default" 1122 selection box, a "Custom" 1124 selection box, and an "Adaptive"1126 selection box. As shown in FIG. 11, selecting the "Save" 1140 command button results in user input and selections within the "Connected Cloud Accounts" 1114 sub-window and the "Data Upload Schedule" 1120 sub-window being used to generate an adaptive upload schedule.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    identifying data center asset data to monitor;
    monitoring a plurality of data center assets within a data center, the plurality of data center assets comprising tangible data center assets, the tangible data center assets having a physical substance;
    selecting an asset data broker from a plurality of asset data brokers, the asset data broker collecting data center asset data from at least one of a particular data center asset and a workload associated with the particular data center asset on a scheduled basis, each asset data broker comprising an intermediary computer program module implemented to collect the data center asset data, each asset data broker communicating with the plurality of data center assets via a network;
    providing the data center asset data to an asset data aggregator, the asset data aggregator performing an asset data aggregation operation, the asset data aggregation operation collecting and aggregating the data center asset data from the plurality of asset data brokers, the asset data aggregator comprising an intermediary computer program module implemented to aggregate the data center asset data, the asset data aggregator being implemented to normalize data center asset data into a predefined, standardized form; and,
    providing aggregated data center asset data to a data center monitoring and management console.

2. The method of claim 1, further comprising:
identifying data center asset operational data; and,
selecting certain data center asset operational data to be collected.

3. The method of claim 2, wherein:
the data center asset operational data includes an associated data center asset data type, the associated data center asset data type comprising a health data center asset data type, a performance data center asset data type, a metrics data center asset data type, a components data center asset data type and an inventory data center asset data type;
the plurality of asset data brokers are implemented to collect health data conforming to the health data center asset data type, performance data conforming to the performance data center asset data type, metrics data conforming to the metrics data asset data type, component data conforming to the components data center asset data type and inventory data conforming the inventory data center asset data type on the scheduled basis.

4. The method of claim 1, further comprising:
analyzing the aggregated data center asset data; and,
customizing data center asset data capture based upon the analyzing.

5. The method of claim 1, wherein:
the broker creates an application program interface for collecting data for particular data center asset data.

6. The method of claim 5, further comprising:
generating a schedule to access the application program interface.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
    identifying data center asset data to monitor;
    monitoring a plurality of data center assets within a data center, the plurality of data center assets comprising tangible data center assets, the tangible data center assets having a physical substance;

selecting an asset data broker from a plurality of asset data brokers, the asset data broker collecting data center asset data from at least one of a particular data center asset and a workload associated with the particular data center asset on a scheduled basis, each asset data broker comprising an intermediary computer program module implemented to collect the data center asset data, each asset data broker communicating with the plurality of data center assets via a network;

providing the data center asset data to an asset data aggregator, the asset data aggregator performing an asset data aggregation operation, the asset data aggregation operation collecting and aggregating the data center asset data from the plurality of asset data brokers, the asset data aggregator comprising an intermediary computer program module implemented to aggregate the data center asset data, the asset data aggregator being implemented to normalize data center asset data into a predefined, standardized form; and, providing aggregated data center asset data to a data center monitoring and management console.

8. The system of claim 7, wherein the instructions executable by the processor are further configured for:
identifying data center asset operational data; and,
selecting certain data center asset operational data to be collected.

9. The system of claim 8, wherein:
the data center asset operational data includes an associated data center asset data type, the associated data center asset data type comprising a health data center asset data type, a performance data center asset data type, a metrics data center asset data type, a components data center asset data type and an inventory data center asset data type
the plurality of asset data brokers are implemented to collect health data conforming to the health data center asset data type, performance data conforming to the performance data center asset data type, metrics data conforming to the metrics data asset data type, component data conforming to the components data center asset data type and inventory data conforming the inventory data center asset data type on the scheduled basis.

10. The system of claim 7, wherein the instructions executable by the processor are further configured for:
analyzing the aggregated data center asset data; and,
customizing data center asset data capture based upon the analyzing.

11. The system of claim 7, wherein:
the broker creates an application program interface for collecting data for particular data center asset data.

12. The system of claim 11, wherein the instructions executable by the processor are further configured for:
generating a schedule to access the application program interface.

13. A non-transitory, computer-readable storage medium embodying computer program code, the computer program code comprising computer executable instructions configured for:
identifying data center asset data to monitor;
monitoring a plurality of data center assets within a data center, the plurality of data center assets comprising tangible data center assets, the tangible data center assets having a physical substance;
selecting an asset data broker from a plurality of asset data brokers, the asset data broker collecting data center asset data from at least one of a particular data center asset and a workload associated with the particular data center asset on a scheduled basis, each asset data broker comprising an intermediary computer program module implemented to collect the data center asset data, each asset data broker communicating with the plurality of data center assets via a network;

providing the data center asset data to an asset data aggregator, the asset data aggregator performing an asset data aggregation operation, the asset data aggregation operation collecting and aggregating the data center asset data from the plurality of asset data brokers, the asset data aggregator comprising an intermediary computer program module implemented to aggregate the data center asset data, the asset data aggregator being implemented to normalize data center asset data into a predefined, standardized form; and, providing aggregated data center asset data to a data center monitoring and management console.

14. The non-transitory, computer-readable storage medium of claim 13, wherein the computer executable instructions are further configured for:
identifying data center asset operational data; and, selecting certain data center asset operational data to be collected.

15. The non-transitory, computer-readable storage medium of claim 14, wherein:
the data center asset operational data includes an associated data center asset data type, the associated data center asset data type comprising a health data center asset data type, a performance data center asset data type, a metrics data center asset data type, a components data center asset data type and an inventory data center asset data type;
the plurality of asset data brokers are implemented to collect health data conforming to the health data center asset data type, performance data conforming to the performance data center asset data type, metrics data conforming to the metrics data asset data type, component data conforming to the components data center asset data type and inventory data conforming the inventory data center asset data type on the scheduled basis.

16. The non-transitory, computer-readable storage medium of claim 14, wherein the computer executable instructions are further configured for:
analyzing the aggregated data center asset data; and,
customizing data center asset data capture based upon the analyzing.

17. The non-transitory, computer-readable storage medium of claim 13, wherein:
the broker creates an application program interface for collecting data for particular data center asset data.

18. The non-transitory, computer-readable storage medium of claim 17, wherein the computer executable instructions are further configured for:
generating a schedule to access the application program interface.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *